(12) United States Patent
Tanase et al.

(10) Patent No.: US 6,777,365 B2
(45) Date of Patent: Aug. 17, 2004

(54) MAGNESIUM COMPOUND, OLEFIN POLYMERIZATION CATALYST, AND METHOD FOR PRODUCING OLEFIN POLYMER

(75) Inventors: Shohjiroh Tanase, Ichihara (JP); Takehiro Tsuda, Ichihara (JP); Tsuyoshi Ota, Ichihara (JP); Hideo Funabashi, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 250 days.

(21) Appl. No.: 09/732,740

(22) Filed: Dec. 11, 2000

(65) Prior Publication Data

US 2001/0012908 A1 Aug. 9, 2001

(30) Foreign Application Priority Data

Dec. 15, 1999 (JP) ............................................. 11-356100
Dec. 15, 1999 (JP) ............................................. 11-356101

(51) Int. Cl.$^7$ .............................................. B01J 31/00
(52) U.S. Cl. ........................ 502/115; 502/103; 502/118; 502/134; 502/172; 526/158; 526/348; 526/123.1; 526/124.3; 423/635; 423/497
(58) Field of Search ................................ 502/115, 103, 502/118, 134, 172; 526/158, 348, 123.1, 124.3, 125.1; 423/635, 497

(56) References Cited

U.S. PATENT DOCUMENTS 4,820,672 A * 4/1989 Mehta ........................ 502/115
4,960,743 A * 10/1990 Murata et al. .............. 502/121

* cited by examiner

Primary Examiner—Ling-Siu Choi
(74) Attorney, Agent, or Firm—Oblon, Spivak, McClelland, Maier & Neustadt, P.C.

(57) ABSTRACT

The invention relates to a magnesium compound effective in producing olefin polymers having an increased bulk density and a narrowed particle size distribution, not lowering the stereospecificity of the polymers produced and not lowering the polymerization activity in producing the polymers, to an olefin polymerization catalyst comprising the compound, and to a method for producing such olefin polymers. The olefin polymerization catalyst comprises (A) a solid catalyst component prepared by contacting a magnesium compound having a specific particle size distribution index (P), a titanium compound and an electron donor compound with each other, (B) an organometallic compound, and (C) an electron donor. The olefin polymerization method comprises polymerizing an olefin in the presence of the catalyst to give olefin polymers.

19 Claims, No Drawings

MAGNESIUM COMPOUND, OLEFIN POLYMERIZATION CATALYST, AND METHOD FOR PRODUCING OLEFIN POLYMER

TECHNICAL FIELD

The present invention relates to a magnesium compound suitable for a carrier for olefin polymerization catalysts, to an olefin polymerization catalyst comprising it, and to a method for producing olefin polymers. Precisely, the invention relates to a magnesium compound effective in producing olefin polymers having an increased bulk density and a narrowed particle size distribution, not lowering the stereospecificity of the polymers produced and not lowering the polymerization activity in producing the polymers, and also relates to an olefin polymerization catalyst comprising the compound, and to a method for producing such olefin polymers.

BACKGROUND ART

Heretofore widely known in the art is a technique of using a carrier of non-ground magnesium chloride or magnesium alkoxide for olefin polymerization catalysts in homopolymerizing or copolymerizing ethylene or propylene, and this is for improving the catalyst activity and for improving the powder morphology of polymers produced. For example, known are a method of holding a magnesium compound on an inorganic oxide such as silica, for improving the morphology including the particle size and the particle shape of the polymers produced in the presence of it (e.g., Japanese Patent Laid-Open No. 280707/1988); and a method of once dissolving a magnesium compound in a solvent of alcohol or the like followed by re-precipitating it, and using it in producing olefin polymers (e.g., Japanese Patent Laid-Open No. 811/1981). However, the methods are problematic in that their steps are extremely complicated since they indispensably require the step of holding a magnesium compound on a carrier or the step of dissolving a magnesium compound followed by re-precipitating it, and that the properties of the catalysts produced are not stable. On the other hand, another method has been developed, which comprises reacting metal magnesium with alcohol and a specific amount of halogen to prepare a magnesium compound for carrier (e.g., Japanese Patent Laid-Open No. 130107/1992). However, this is still problematic in that the powder morphology (a bulk density, a particle size distribution or the like) of the polymers produced in the presence of it is not all the time satisfactory.

The present invention has been made in consideration of the matters noted above, and its object is to provide a magnesium compound effective in producing olefin polymers having an increased bulk density and a narrowed particle size distribution, not lowering the stereospecificity of the polymers produced and not lowering the polymerization activity in producing the polymers, and also to provide an olefin polymerization catalyst comprising the compound and a method for producing such olefin polymers.

DISCLOSURE OF THE INVENTION

We, the present inventors have assiduously studied in order to attain the object as above, and have found that the object can be attained by an olefin polymerization catalyst that comprises a solid catalyst component prepared by contacting a magnesium compound (this is prepared by reacting a metal magnesium, an alcohol, and at least 0.0001 gram atoms, in terms of the halogen atom relative to one gram atom of magnesium, of a halogen and/or a halogen-containing compound, at a specifically controlled temperature) with titanium and optionally with an electron donor compound, and an organoaluminium compound. On the basis of this finding, we have completed the first aspect of the invention.

Specifically, the first aspect of the invention is to provide a magnesium compound, an olefin polymerization catalyst and a method for producing olefin polymers mentioned below.

1. A magnesium compound obtained by reacting a metal magnesium, an alcohol, and at least 0.0001 gram atoms, in terms magnesium, an alcohol, and at least 0.0001 gram atoms, in terms of the halogen atom relative to one gram atom of magnesium, of a halogen and/or a halogen-containing compound, at 30 to 60° C.

2. The magnesium compound of above 1, wherein the halogen is iodine.

3. The magnesium compound of above 1, wherein the halogen-containing compound is magnesium chloride.

4. A solid magnesium compound substantially comprising a magnesium alkoxide, of which the particle size distribution index (P) represented by the following formula (I-1) is smaller than 4.0, P<4.0:

$$P=(D_{90}/D_{10}) \qquad (I-1)$$

(wherein $D_{90}$ indicates the particle diameter of the compound particles corresponding to the cumulative weight fraction of 90% in the particle size distribution thereof computed from the light transmittance through a suspension of the compound particles in a hydrocarbon; and $D_{10}$ indicates the particle diameter of the compound particles corresponding to the cumulative weight fraction of 10% therein.)

5. An olefin polymerization catalyst comprising (A) a solid catalyst component prepared by contacting (a) the magnesium compound of any of above 1 to 4 with (b) a titanium compound of the following general formula (I-3), and (B) an organometallic compound:

$$Ti(OR)_nX_{4-n} \qquad (I-3)$$

(wherein X indicates a halogen atom; R indicates a hydrocarbon group having from 1 to 10 carbon atoms, and R's may be the same or different; and n indicates an integer of from 0 to 4.)

6. An olefin polymerization catalyst comprising (A) a solid catalyst component prepared by contacting (a) the magnesium compound of any of above 1 to 4, (b) a titanium compound of the following general formula (I-3) and (c) an electron donor compound with each other, (B) an organometallic compound, and (C) a third component of an electron donor compound:

$$Ti(OR)_nX_{4-n} \qquad (I-3)$$

(wherein X indicates a halogen atom; R indicates a hydrocarbon group having from 1 to 10 carbon atoms, and R's may be the same or different; and n indicates an integer of from 0 to 4.)

7. A method for producing olefin polymers, which comprises polymerizing an olefin in the presence of the olefin polymerization catalyst of above 5 or 6.

We, the present inventors have further found that the object of the invention can be attained by an olefin polymerization catalyst that comprises a solid catalyst component prepared by contacting a specific magnesium compound (this is prepared by reacting a metal magnesium, an alcohol, and at least 0.0005 gram atoms, in terms of the halogen atom relative to one gram atom of magnesium, of a halogen and/or hydrocarbon compound) with titanium and optionally with an electron donor compound, and an organoaluminium compound. On the basis of this finding, we have completed the second aspect of the invention.

Specifically, the second aspect of the invention is to provide a magnesium compound, an olefin polymerization catalyst and a method for producing olefin polymers mentioned below.

1. A magnesium compound obtained by reacting a metal magnesium, an alcohol, and at least 0.0005 gram atoms, in terms of the halogen atom relative to one gram atom of magnesium, of a halogen and/or a halogen-containing compound, in the presence of a saturated hydrocarbon compound.

2. The magnesium compound of above 1, wherein the halogen is iodine.

3. The magnesium compound of above 1, wherein the halogen-containing compound is magnesium chloride.

4. A solid magnesium compound substantially comprising a magnesium alkoxide, of which the particle size distribution index (P) represented by the following formula (II-1) is smaller than 4.0, P<4.0:

$$P=(D_{90}/D_{10}) \quad \text{(II-1)}$$

(wherein $D_{90}$ indicates the particle diameter of the compound particles corresponding to the cumulative weight fraction of 90% in the particle size distribution thereof computed from 90% in the particle size distribution thereof computed from the light transmittance through a suspension of the compound particles in a hydrocarbon; and $D_{10}$ indicates the particle diameter of the compound particles corresponding to the cumulative weight fraction of 10% therein.)

5. An olefin polymerization catalyst comprising (A) a solid catalyst component prepared by contacting (a) the magnesium compound of any of above 1 to 4 with (b) a titanium compound of the following general formula (II-3), and (B) an organometallic compound:

$$Ti(OR)_nX_{4-n} \quad \text{(II-3)}$$

(wherein X indicates a halogen atom; R indicates a hydrocarbon group having from 1 to 10 carbon atoms, and R's may be the same or different; and n indicates an integer of from 0 to 4.

6. An olefin polymerization catalyst comprising (A) a solid catalyst component prepared by contacting (a) the magnesium compound of any of above 1 to 4, (b) a titanium compound of the following general formula (II-3) and (c) an electron donor compound with each other, (B) an organometallic compound, and (C) a third component of an electron donor compound:

$$Ti(OR)_nX_{4-n} \quad \text{(II-3)}$$

(wherein X indicates a halogen atom; R indicates a hydrocarbon group having from 1 to 10 carbon atoms, and R's may be the same or different; and n indicates an integer of from 0 to 4.) comprises polymerizing an olefin in the presence of the olefin polymerization catalyst of above 5 or 6.

BEST MODES OF CARRYING OUT THE INVENTION

Modes of carrying out the invention are described below.
[I] First Aspect of the Invention The first aspect of the invention (in this section, this will be simply referred to as "the invention") is to provide the magnesium compound, the olefin polymerization catalyst and the method for producing olefin polymers as above. These are described in detail hereinunder.
[I] Magnesium Compound The magnesium compound of the invention (this will be referred to as a carrier) is obtained by reacting a metal magnesium, an alcohol, and at least 0.0001 gram atoms, in terms of the halogen atom relative to one gram atom of magnesium, of a halogen and/or a halogen-containing compound, at 30 to 60° C. For this, the morphology of the metal magnesium is not specifically defined. Therefore, metal magnesium of any size is employable herein, including, for example, granular, ribbon-like and powdery metal magnesium. The surface condition of the metal magnesium is not specifically defined, but metal magnesium not coated with a film of magnesium hydroxide is preferred for use herein. The type of the alcohol for use herein is not also specifically defined, but preferred are lower alcohols having from 1 to 6 carbon atoms. More preferred is ethanol, as giving a solid product with much improved catalytic capabilities. The purity and the water content of the alcohol are not also specifically defined. However, alcohol having a high water content will form magnesium hydroxide on the surface of the metal magnesium. Therefore, the alcohol for use herein preferably has a water content of at most 1% by weight, more preferably at most 2000 ppm. For better morphology of the magnesium compound to be obtained, the water content of the alcohol is preferably smaller. In general, it is desirable that the water content of the alcohol is at most 200 ppm.

The type of the halogen is not specifically defined, but preferred is chlorine, bromine or iodine. More preferred is iodine. The type of the halogen-containing compound is not also specifically defined, and any and every type of compounds containing halogen atom(s) in the chemical formula are usable herein. In the compounds, the type of the halogen atom is not specifically defined, but preferred is chlorine, bromine or iodine. Especially preferred are halogen-containing metal compounds. Preferred examples of the halogen-containing compound are $MgCl_2$, $MgI_2$, $Mg(OEt)Cl$, $Mg(OEt)I$, $MgBr_2$, $CaCl_2$, $NaCl$, $KBr$. Of those, especially preferred is $MgCl_2$. For their condition, form and granularity, the halogen and the halogen-containing metal compound are not specifically defined, and they may be any desired ones. For example, their solutions in an alcohol solvent (e.g., ethanol) are acceptable herein.

The amount of the alcohol is not specifically defined, but is preferably from 2 to 100 mols, more preferably from 5 to 50 mols relative to one mol of the metal magnesium. Too much alcohol, if used, will lower the yield of the magnesium compound of good morphology. However, if the amount of the alcohol used is too small, smoothly stirring the reactants in a reactor will be impossible. However, the molar ratio defined above is not limitative.

The amount of the halogen and/or the halogen-containing compound to be used is at least 0.0001 gram atoms, preferably at least 0.0005 gram atoms, more preferably at least 0.001 gram atoms in terms of the halogen atom relative to one gram atom of the metal magnesium. In case where the amount of the halogen and/or the halogen-containing compound used is smaller than 0.0001 gram atoms, it does not differ from the case where a halogen is used as a reaction initiator; and if the resulting magnesium compound is used as a carrier for the catalyst in olefin polymerization, the catalyst activity is poor and the polymers produced could not have good morphology. The uppermost limit of the amount of the halogen to be used is not specifically defined, and may be suitably determined within a range within which the intended magnesium compound of the invention can be obtained. In general, the amount of the halogen shall be smaller than 0.06 gram atoms. In the invention, one type or two or more different types of halogen and halogen-containing compounds may be used either singly or as combined. If desired, a halogen and a halogen-containing compound may be combined for use herein. Regarding the amount of the two, if combined for use herein, the total halogen content of the combination shall be at least 0.0001 gram atoms, preferably at least 0.0005 gram atoms, more preferably at least 0.001 gram atoms, relative to one gram atom of the metal magnesium. In this case, the uppermost limit of the total halogen content is not specifically defined, and may be suitably determined within a range within which the intended magnesium compound of the invention can be obtained. In general, it is preferably smaller than 0.06 gram atoms. The particle size of the magnesium compound to be produced herein can be well controlled by changing and controlling the amount of the halogen and/or the halogen-containing compound to be used. The reaction itself of the metal magnesium, the alcohol, and the halogen and/or the halogen-containing compound may be effected in any known manner, except that the reaction temperature is defined to fall between 30 and 60° C. Specifically, they are reacted until hydrogen gas is no more generated, generally for 10 to 30 hours to obtain the intended magnesium compound. Concretely, in case where iodine is used as the halogen, solid iodine is put into an alcohol with a metal magnesium therein, and then reacted with them under heat; or an alcohol solution of iodine is dropwise put into an alcohol with a metal magnesium therein, and then heated; or an alcohol solution of iodine is dropwise put into an alcohol solution of a metal magnesium under heat. Preferably, these methods are effected in an inert gas (e.g., nitrogen gas, argon gas) atmosphere. For the mode of putting the metal magnesium, the alcohol and the halogen into the reactor, it is not always necessary that they are put thereinto all at a time in the initial stage of reaction, but they may be divided into some portions and may be intermittently put into the reactor. In one preferred mode of reacting them, the entire amount of alcohol is first put into a reactor before the start of the reaction, and thereafter metal magnesium having been divided into some portions is intermittently put into the reactor. In this mode of reaction, it is possible to evade the sudden generation of a large amount of hydrogen gas. Therefore, this mode of reaction is preferred, as being safe. The other advantages of this mode of reaction are that the reactor to be used may be down-sized, and that the alcohol and the halogen put into the reactor are prevented from being scattered in and around the reactor since the reaction does not give a large amount of hydrogen gas. The number of the divided portions of the metal magnesium and the frequency of adding the thus-divided metal magnesium portions to the reactor shall be determined, depending on the scale of the reactor used, and is not specifically defined. In view of the easiness in completing the reaction, the frequency of adding the divided metal magnesium portions to the reactor will be generally from 5 to 10 times. Needless-to-say, the reaction may be effected in any mode of batch reaction or continuous reaction. In another modification of the reaction, a small amount of metal magnesium is put into a reactor already containing the entire amount of alcohol, then the reaction product produced is separated and taken out into a different tank, and thereafter a small amount of metal magnesium is again put into the reactor, and this process is repeated.

In the invention, the reaction must be effected at 30 to 60° C. Within the limited temperature range, it is easy to obtain a magnesium compound capable of giving an olefin polymer having a higher bulk density and a more narrowed particle size distribution than conventionally.

In case where the magnesium compound obtained in the manner as above is used in producing the solid catalyst component (A) (this will be mentioned hereinunder), it may be dried or may be washed with an inert solvent such as heptane, after having been filtered out of the reaction mixture and before being used in producing the solid catalyst component (A). Anyhow, the magnesium compound obtained can be directly used in the next step, without being further ground or classified to dress its particles. The particles of the magnesium compound of the invention thus obtained are more spherical and have a more narrowed and sharper particle size distribution than those of any other conventional magnesium compounds. In addition, the distribution of sphericity of the individual particles is narrow.

The invention also provides a solid magnesium compound substantially comprising a magnesium alkoxide, of which the particle size distribution index (P) represented by the following formula (I-1) is smaller than 4.0, P<4.0.

$$P=(D_{90}/D_{10}) \tag{I-1}$$

(wherein $D_{90}$ indicates the particle diameter of the compound particles corresponding to the cumulative weight fraction of 90% in the particle size distribution thereof computed from the light transmittance through a suspension of the compound particles in a hydrocarbon; and $D_{10}$ indicates the particle diameter of the compound particles corresponding to the cumulative weight fraction of 10% therein.)

P is the particle size distribution index of a particulate compound, indicating the degree of the particle size distribution of the compound. A particulate compound having a smaller value of P has a narrower and sharper particle size distribution, and therefore contains a larger amount of particles having a uniform particle size. To that effect, the solid magnesium compound of the invention preferably has P of smaller than 3.8, P<3.8.

Also preferably, the solid magnesium compound has a degree of sphericity (S) of the following formula (I-2) of smaller than 2.0, S<2.0.

$$S=(L_1/L_2)^3 \tag{I-2}$$

(wherein $L_1$ indicates the major diameter of the magnesium compound particle obtained by imaging the compound through scanning electronic microscopy followed by analyzing the projected image of the particle; and $L_2$ indicates the diameter of the circle having the same area as the projected area of the magnesium compound particle.)

S indicates the degree of sphericity of a substance, and a substance having S=1 is a complete sphere. Therefore, the magnesium compound of which S is nearer to 1 means that its individual particles are nearer to complete spheres. More preferably, the solid magnesium compound of the invention has S of smaller than 1.5, S<1.5.

The solid magnesium compound generally has a mean particle size of from 10 to 100 µm. When compared with conventional magnesium compounds of which the mean particle size is nearly the same as that of the solid magnesium compound of the invention, the solid magnesium compound of the invention has a smaller degree of sphericity, S, than that of the conventional magnesium compounds, and therefore its particles conventional magnesium compounds, and therefore its particles are nearer to complete spheres than the conventional magnesium compound particles. The solid magnesium compound of this type of the invention may be produced according to the method mentioned hereinabove.

[II] Olefin Polymerization Catalyst

The olefin polymerization catalyst of the invention comprises (A) a solid catalyst component prepared by contacting (a) the magnesium compound mentioned above, (b) a titanium compound of the following general formula (I-3) and optionally (c) an electron donor compound with each other, (B) an organometallic compound, and optionally (C) a third component of an electron donor compound.

$$Ti(OR)_nX_{4-n} \qquad (I\text{-}3)$$

(wherein X indicates a halogen atom; R indicates a hydrocarbon group having from 1 to 10 carbon atoms, and R's may be the same or different; and n indicates an integer of from 0 to 4.)

The constituent components are described below.

Component (A)

The component (A) is a solid catalyst component prepared by contacting (a) the magnesium compound mentioned above, (b) a titanium compound of formula (I-3) and optionally (c) an electron donor compound with each other.

Component (a)

The component (a) is the magnesium compound mentioned

Component (b)

The component (b) is a titanium compound of formula (I-3). In formula (I-3), X indicates a halogen atom, and is preferably a chlorine atom or a bromine atom, more preferably a chlorine atom. R indicates a hydrocarbon group, and it may be saturated or unsaturated, and may be linear, branched or cyclic. It may contain hetero atoms of sulfur, nitrogen, oxygen, silicon, phosphorus and others. Preferably, R is a hydrocarbon group having from 1 to 10 carbon atoms, more preferably an alkyl group, an alkenyl group, a cycloalkenyl group, an aryl group or an aralkyl group, even more preferably a linear or branched alkyl group. A plurality —OR groups, if any, in the formula may be the same or different. Specific examples of R include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group, a phenethyl group, etc. n indicates an integer of from 0 to 4.

Specific examples of the titanium compound of formula (I-3) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitaniumtrihalides such as methoxytitaniumtrichloride, ethoxytitanium trichloride, n-propoxytitanium trichloride, n-butoxytitanium trichloride, ethoxytitanium tribromide, etc.; dialkoxytitanium dihalides such as dimethoxytitanium dichloride, diethoxytitanium dichloride, diisopropoxytitanium dichloride, di-n-propoxytitanium dichloride, diethoxytitanium dibromide, etc.; trialkoxytitanium monohalides such as trimethoxytitanium chloride, triethoxytitanium chloride, triisopropoxytitanium chloride, tri-n-propoxytitanium chloride, tri-n-butoxytitanium chloride, etc. Of those, preferred are high-halogen titanium compounds, and especially preferred is titanium tetrachloride. One or more of these titanium compounds may be used herein either singly or as combined.

Electron Donor Compound (c)

In the invention, optionally used is an electron donor compound (c). The electron donor compound (c) improves the stereospecificity of the olefin polymers produced, and using it in the invention is preferred. The electron donor compound (c) includes oxygen-containing electron donors, for example, alcohols, phenols, ketones, aldehydes, carboxylic acids, malonic acid, esters of organic acids or inorganic acids, ethers such as monoethers, diethers or polyethers, etc.; and nitrogen-containing electron donors such as ammonia, amines, nitriles, isocyanates, etc. Of those, preferred are ester of polycarboxylates, and more preferred are esters of aromatic polycarboxylates. Even more preferred are esters of aromatic dicarboxylates. Preferably, the organic group in the ester moiety of these esters is a linear, branched or cyclic aliphatic hydrocarbon residue.

Concretely mentioned are dialkyl esters of dicarboxylic acids such as phthalic acid, naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indane-4,5-dicarboxylic acid, indane-5,6-dicarboxylic acid, etc., in which the alkyl groups may be any of methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-ethylpentyl, and 3-ethylpentyl groups. Of these, preferred are diphthalates. Preferably, the organic group in the ester moiety of these esters is a linear or branched aliphatic hydrocarbon residue having at least 4 carbon atoms.

The solid catalyst component (A) is prepared by contacting the magnesium compound (a), the titanium compound (b) and optionally the electron donor compound (c) and further optionally a halide (d) such as silicon tetrachloride with each other, and they be contacted and reacted with each other in any ordinary manner. Some preferred conditions for their amount and the order in which they are contacted with each other are mentioned below.

The amount of the titanium compound (b) to be used may fall generally between 0.5 and 100 mols, but preferably between 1 and 50 mols, per mol of magnesium of the magnesium compound (a). The amount of the electron donor compound (c) to be used may fall generally between 0.01 and 10 mols, but preferably between 0.05 and 0.15 mols, per mol of magnesium of the magnesium compound (a). For the halide (d), preferred are silicon tetrachloride, silicon tetrabromide, tin tetrachloride, tin tetrabromide and hydrogen chloride; and more preferred is silicon tetrachloride. The temperature at which the constituent components are contacted with each other to prepare the solid catalyst component may fall generally between −20 and 200° C., but preferably between 20 and 150° C.; and the contact time for them may fall generally between 1 minute and 24 hours, but preferably between 10 minutes and 6 hours. The order of contacting them with each other is not specifically defined. For example, the constituent components may be contacted with each other in an inert solvent such as hydrocarbons, etc.; or, as the case may be, they are separately diluted with an inert solvent such as hydrocarbons, etc., and then contacted with each other. The inert solvent includes, for example, aliphatic hydrocarbons such as n-pentane, isopentane, n-hexane, n-heptane, n-octane, isooctane, etc.; aromatic hydrocarbons such as benzene, toluene, xylene, etc.; and their mixtures.

Preferably, the titanium compound is contacted twice or more with the magnesium compound serving as a carrier, so that it can be well held on the magnesium compound.

The solid catalyst component thus prepared through the contact treatment as above may be washed with an inert solvent such as hydrocarbons, etc. For the inert solvent, usable are those mentioned above. The solid catalyst component may be stored in dry, or may be stored in an inert solvent such as hydrocarbons, etc.

Component (B)

The component (B) includes organoaluminium compounds. The organoaluminium compounds for it are not specifically defined, but preferred are those having any of alkyl groups, halogen atoms, hydrogen atoms and alkoxy groups, aluminoxanes, and their mixtures. Concretely, they include trialkylaluminiums such as trimethylaluminium, triethylaluminium, triisopropylaluminium, triisobutylaluminium, trioctylaluminium, etc.; dialkylaluminium monochlorides such as diethylaluminium monochloride, diisopropylaluminium monochloride, diisobutylaluminium monochloride, dioctylaluminium monochloride, etc.; alkylaluminium sesquihalides such as ethylaluminium sesquichloride, etc.; linear aluminoxanes such as methylaluminoxane, etc. Of those organoaluminium compounds, preferred are trialkylaluminiums with lower alkyl groups each having from 1 to 5 carbon atoms; and more preferred are trimethylaluminium, triethylaluminium, triisopropylaluminium, and triisobutylaluminium. One or more of these organoaluminium compounds are usable herein either singly or as combined.

Electron Donor Compound (C)

In the invention, optionally used is a third component of an electron donor compound (C). Using an electron donor compound is preferred, as improving the stereospecificity of the olefin polymers produced. The component (C) includes alkoxy group-having organosilicon compounds, nitrogen-containing compounds, phosphorus-containing compounds, and oxygen-containing compounds. Of those, especially preferred are alkoxy group-having organosilicon compounds. Specific examples of the compounds are trimethylmethoxysilane, triethylmethoxysilane, dimethyldimethoxysilane, dimethyldiethoxysilane, diphenyldimethoxysilane, dimethyldiethoxysilane, diphenyldimethoxysilane, diphenyldiethoxysilane, dicyclohexyldimethoxysilane, cyclohexylmethyldimethoxysilane, cyclohexyl-isobutyldimethoxysilane, cyclohexyl-1,1,2-trimethylpropyldimethoxysilane, α-naphthyl-1,1,2-trimethylpropyldimethoxysilane, n-tetradecanyl-1,1,2-trimethylpropyldimethoxysilane, cyclopentylmethyldimethoxysilane, cyclopentylethyldimethoxysilane, cyclopentylpropyldimethoxysilane, cyclopentyl-t-butyldimethoxysilane, cyclopentyl-1,1,2-trimethylpropyldimethoxysilane, dicyclopentyldimethoxysilane, cyclopentylcyclohexyldimethoxysilane, t-butylmethyldimethoxysilane, t-butylethyldimethoxysilane, t-butylpropyldimethoxysilane, di-t-butyldimethoxysilane, diisopropyldimethoxysilane, isopropylisobutyldimethoxysilane, γ-chloropropyltrimethoxysilane, methyltriethoxysilane, ethyltriethoxysilane, vinyltriethoxysilane, butyltriethoxysilane, phenyltriethoxysilane, γ-aminopropyltriethoxysilane, chlorotriethoxysilane, ethyltriisopropoxysilane, vinyltributoxysilane, methyl-t-butoxydimethoxysilane, isopropyl-t-butoxydimethoxysilane, cyclopentyl-t-butoxydimethoxysilane, 1,1,2-trimethylpropyltrimethoxysilane, ethyl silicate, butyl silicate, trimethylphenoxysilane, methyltrialloxysilane, vinyltris (β-methoxyethoxy) silane, vinyltrisacetoxysilane, dimethyltetraethoxydisiloxane, etc. One or more of these organosilicon compounds may be used herein either singly or as combined.

The amount of the catalyst components to be used is not specifically defined. In general, the amount of the solid catalyst component (A) to be used may fall between 0.0005 and 1 mmol, in terms of the titanium atom therein, per $dm^3$ of the reaction capacity. For the amount of the organometallic compound (B) to be used, the atomic ratio, aluminium/titanium may fall generally between 1 and 10000, but preferably between 10 and 1000. If the atomic ratio oversteps the defined range, the catalyst activity will be low. For the amount of the electron donor compound (C) to be used, the molar ratio, electron donor compound/organoaluminium compound may fall generally between 0.02 and 2.0, but preferably between 0.05 and 1.0. If the molar ratio oversteps the defined range, the catalyst activity will also be low.

[III] Method for Producing Olefin Polymers

For producing olefin polymers according to the invention, an olefin is polymerized in the presence of the above-mentioned olefin polymerization catalyst. The olefin to be polymerized herein is not specifically defined, but preferred are α-olefins of the following general formula (I-4):

$$R^1\text{—CH=CH}_2 \tag{I-4}$$

In formula (I-4), $R^1$ indicates a hydrogen atom or a hydrocarbon group, and the hydrocarbon group may be saturated or unsaturated, and may be linear, branched or cyclic. Concretely, the α-olefins include ethylene, propylene, 1-butene, 1-pentene, 1-hexene, 1-heptene, 1-octene, 1-decene, 3-methyl-1-pentene, 4-methyl-1-pentene, vinylcyclohexane, etc. One or more of these olefins may be used herein either singly or as combined. Of the olefins mentioned above, especially preferred is propylene. For its polymerization mode, the olefin may be homopolymerized or copolymerized. Especially preferred is homopolymerization of propylene, or copolymerization of propylene with ethylene and/or an α-olefin having from 4 to 20 carbon atoms (1-butene, 1-hexene, etc.). If desired, dienes such as butadiene, and any other olefins may be additionally used in producing the olefin polymers.

In the olefin polymerization method of the invention, if desired, an olefin may be first prepolymerized and then finally polymerized. Regarding its prepolymerization, for example, an olefin such as that mentioned above is prepolymerized in the presence of the catalyst mentioned above, generally at a temperature falling between 0 and 100° C. and under a pressure falling between normal pressure and 5 MPa or so. The prepolymerization time may fall between 1 minute and 10 hours, preferably between 10 minutes and 5 hours. The degree of prepolymerization may fall generally between 0.1 and 1000% by weight, but preferably between 1 and 500% by weight, relative to the solid catalyst component used. The olefin to be prepolymerized may be any of the above-mentioned α-olefins. Preferably, however, it is the same α-olefin as that to be finally polymerized to give the intended olefin polymer. Next, in the presence of the catalyst and the thus-prepolymerized product, an olefin is finally polymerized to give the intended olefin polymer. The mode of final polymerization is not specifically defined, and may be any of solution polymerization, slurry polymerization, vapor-phase polymerization or bulk polymerization. Any of batch polymerization and continuous polymerization may apply thereto. If desired, two-stage polymerization in which the two stages are effected under different conditions, or block polymerization in which an additional α-olefin such as ethylene, 1-butene or 1-hexene is block-polymerized in the second stage may also apply to the invention. Further, multi-stage polymerization may apply thereto. Regarding the reaction condition for the method of the invention, the polymerization pressure is not specifically defined and may fall generally between atmospheric pressure and 8 MPa, but preferably between 0.2 and 5 MPa; the polymerization temperature may fall generally between 20 and 90° C., but preferably between 40 and 90° C. The polymerization time shall vary, depending on the type of the starting olefin and on the polymerization temperature, and could not be indiscriminately defined. In general, however, it may fall between 5 minutes and 20 hours, preferably between 10 minutes and 10 hours or so. The molecular weight of the polymer to be produced can be controlled by adding a chain transfer agent to the polymerization system, preferably hydrogen thereto. If desired, an inert gas such as nitrogen or the like may be present in the polymerization system.

Regarding the catalyst components for use in the invention, the component (A), the component (B) and the component (C) may be previously blended in a predetermined ratio so that they are contacted with each other, and immediately an olefin may be applied thereto to start its polymerization. Alternatively, after the catalyst components have been contacted with each other, the resulting catalyst may be ripened for 0.2 to 3 hours or so, and thereafter an olefin may be applied thereto and polymerized in the presence of the thus-ripened catalyst. If desired, the catalyst components may be previously suspended in an inert solvent or olefin, and then fed into the polymerization system.

In the invention, the post-treatment after polymerization may be effected in any ordinary manner. For example, in vapor-phase polymerization, the powdery polymer produced is taken out of the polymerization reactor, and then exposed to a nitrogen stream atmosphere so as to remove the non-reacted olefin from it. If desired, the polymer may be pelletized through an extruder. In this step, a small amount of water, an alcohol or the like may be added to the polymer so as to completely inactivate the catalyst. In bulk polymerization, the polymer produced is taken out of the polymerization reactor, then the non-reacted monomer is completely removed from it, and thereafter the polymer may be pelletized. According to the method of the invention, the powdery olefin polymer produced has the advantages of high bulk density and narrow particle size distribution. Other advantages of the invention are that the polymer produced has good stereospecificity and that the catalyst used has high polymerization activity. For example, in homopolymerization of propylene in the method, produced is a propylene homopolymer having a bulk density (kg/m$^3$) of at least 340, preferably at least 380, and having good stereospecificity, and the catalyst used exhibits high polymerization activity. In addition, the propylene homopolymer thus produced has a particle size distribution index (P') of smaller than 4.0, P'<4.0, preferably smaller than 3.8, P'<3.8. That is, the particle size distribution of the propylene homopolymer is narrower than that of conventional propylene homopolymers. The method for computing the particle size distribution index of the polymer is described in detail in the next section of Examples. When compared with conventional propylene homopolymers of which the mean particle size is nearly the same as that of the propylene homopolymer produced according to the method of the invention, the propylene homopolymer produced in the invention has a smaller degree of sphericity (S') than that of the conventional propylene homopolymers. For its powdery morphology, the particles of the propylene homopolymer produced in the invention are nearer to complete spheres than those of conventional propylene homopolymers. The method for computing the degree of sphericity of the polymer is described in detail in the next section of Examples.

The invention is described in more detail with reference to the following Examples, which, however, are not intended to restrict the scope of the invention.

The methods for analyzing and evaluating the polymers of the invention are described below.

(1) Stereospecificity [mmmm]

A sample of the polymer to be analyzed is dissolved in 1,2,4-trichlorobenzene, and subjected to a proton complete decoupling method for $^{13}$C-NMR (using JEOL' EX-400) at 130° C. Based on the signals for the methyl group obtained in the method, the stereospecificity [mmmm] of the sample is determined. The isotactic pentad fraction [mmmm] referred to herein for polymer stereospecificity was proposed by A. Zambelli et al. in *Macromolecules*, 6, 925 (1973), and it indicates the isotactic fraction in the pentad units of a polypropylene molecular chain measured in $^{13}$C nuclear magnetic resonance spectrometry. For the attribution of the peaks seen in the $^{13}$C nuclear magnetic resonance spectrometry, referred to is the A. Zambelli et al's proposal in *Macromolecules*, 8, 687 (1975).

(2) Particle Size Distribution Index (P) of Magnesium Compound

A sample of the magnesium compound to be analyzed is suspended in a hydrocarbon, and its particle size is obtained from the light transmittance through the suspension. The thus-obtained particle size distribution is plotted on a logarithmico-normal probability paper, and the 50% particle size read thereon is the mean particle size of the sample. The particle diameter of the sample particles corresponding to the cumulative weight fraction of 90% in the thus-plotted particle size distribution thereof is represented by $D_{90}$; and that of the sample particles corresponding to the cumulative weight fraction of 10% therein is represented by $D_{10}$. From these, the particle size distribution index, P, of the magnesium compound is obtained according to the above-mentioned formula (I-1).

(3) Sphericity (S) of Magnesium Compound

A dry sample of the magnesium compound to be analyzed is photographed with a scanning electronic microscope (JEOL's JSM-25SIII) at an accelerated voltage of 5 KV to obtain a 300-magnification negative image. The negative image is analyzed according to a light transmission method, for which is used an image analyzer (from Nexsus). Precisely, the particles of not larger than 20 pixels (one pixel has a size of 0.695 μm×0.695 μm) are cut off on the image, and about 2000 of the remaining particles are analyzed. The major diameter of the projected image of the particle is represented by $L_1$; and the diameter of the circle having the same area as the projected area of the particle is represented by $L_2$. From these, the sphericity, S, of the magnesium compound is obtained according to the above-mentioned formula (I-2).

(4) Particle Size Distribution Index (P') of Polyolefin Powder

The particle size distribution index (P') of polyolefin powder is obtained as follows: A sample of the polyolefin powder to be analyzed is sieved and measured to determine its particle size distribution. The thus-obtained particle size distribution is plotted on a logarithmico-normal probability paper, and the 50% particle size read thereon is the mean particle size of the sample. The particle diameter of the sample particles corresponding to the cumulative weight fraction of 90% in the thus-plotted particle size distribution thereof is represented by $D_{90}$; and that of the sample particles corresponding to the cumulative weight fraction of 10% therein is represented by $D_{10}$. From these, the particle size distribution index, P', of the polyolefin powder is obtained, as in the above-mentioned formula (I-1).

(5) Sphericity (S') of Polyolefin Powder

In the same manner as that for analyzing the magnesium compound particles as above, the sample of the polyolefin powder to be analyzed is photographed with a polarizing microscope (Olympus's BHS-751P) to obtain a 40-magnification image, and the image is analyzed. One pixel size herein is 10.4 $\mu$m×10.4 $\mu$m; and about 300 particles are analyzed. From the data of $L_1$ and $L_2$ computed in the same manner as above, the sphericity, S', of the polyolefin powder is obtained, as in the above-mentioned formula (I-2).

(6) Bulk Density of Polyolefin Powder

Measured according to JIS K6721.

EXAMPLE I-1

(1) Preparation of Magnesium Compound 122 g (2.64 gram atoms) of dewatered ethanol, 0.8 g (6.3 milligram atoms) of iodine, and 8 g (0.33 gram atoms) of metal magnesium were put into a 0.5 dm$^3$ three-neck flask equipped with a stirrer and purged with nitrogen, and these were reacted with stirring (5.83 sec$^{-1}$, 350 rpm) at 40° C. until hydrogen gas was no more generated. A magnesium compound was thus obtained.

(2) Preparation of Solid Catalyst Component

A 0.5 dm$^3$ three-neck flask equipped with a stirrer was purged with nitrogen, and 16 g of the magnesium compound obtained in the step (1) was put thereinto, to which was added 0.080 dm$^3$ of dewatered octane. This was heated at 40° C., and 0.0024 dm$^3$ (23 mmols) of silicon tetrachloride was added thereto and stirred for 20 minutes, to which was added 0.0035 dm$^3$ (13 mmols) of di-n-butyl phthalate. The resulting solution was further heated up to 80° C., and 0.062 dm$^3$ (0.56 mols) of titanium tetrachloride was dropwise added thereto through a dropping funnel. Next, the flask was still further heated to have an inner temperature of 125° C., at which the compounds therein were contacted with each other for 2 hours. After this, the reaction mixture was fully washed with dewatered octane. 0.107 dm$^3$ (0.98 mols) of titanium tetrachloride was added to this, and heated to have an inner temperature of 125° C., at which the compounds were again contacted with each other for 2 hours. Next, this was fully washed with dewatered octane. Thus was obtained a solid catalyst component.

(3) Propylene Slurry Polymerization

A one dm$^3$ stainless autoclave equipped with a stirrer was fully dried and purged with nitrogen, and 0.4 dm$^3$ of dewatered heptane was put into it. 2.0 mmols of triethylaluminium and then 0.25 mmols of dicyclopentyldimethoxysilane (DCPDMS) were added thereto in that order. Then, 0.0025 mmols, in terms of Ti, of the solid catalyst component prepared in (2) was added thereto, and hydrogen (0.1 MPa) and propylene were introduced thereinto in that order to have a total pressure of 0.8 MPa. With that, the monomer propylene was polymerized at 80° C. for 1 hour. Next, the system was cooled and degassed, and the reaction mixture was taken out of it. This was put into 2 dm$^3$ of methanol, and then dried in vacuum to obtain polypropylene. The results are given in Table I-1 and Table I-2.

COMPARATIVE EXAMPLE I-1

(1) Preparation of Magnesium Compound

The same process as in Example I-1 was repeated, except that the reaction temperature herein was about 78° C. (at which the reactants were in reflux)

(2) Preparation of Solid Catalyst Component

The same process as in Example I-1 was repeated, except that the magnesium compound prepared as above was used herein.

(3) Propylene Slurry Polymerization

The same process as in Example I-1 was repeated, except that the solid catalyst component prepared as above was used herein. The results are given in Table I-1 and Table-2. The particle size distribution index (P) of the carrier was over 4.0; and the bulk density of the polymer obtained was 310 (kg/m$^3$) and was low.

EXAMPLE I-2

(1) Preparation of Magnesium Compound

The same process as in Example I-1 was repeated, except that the reaction temperature herein was 50° C.

(2) Preparation of Solid Catalyst Component

The same process as in Example I-1 was repeated, except that the magnesium compound prepared as above was used herein.

(3) Propylene Slurry Polymerization

The same process as in Example I-1 was repeated, except that the solid catalyst component prepared as above was used herein. The results are given in Table I-1 and Table I-2.

EXAMPLE I-3

(1) Preparation of Magnesium Compound

The same process as in Example I-2 was repeated, except that the amount of iodine used herein was 0.24 g (1.9 milligram atoms) and that the number of revolution was 8.75 sec$^{-1}$ (525 rpm).

(2) Preparation of Solid Catalyst Component

The same process as in Example I-1 was repeated, except that the magnesium compound prepared as above was used herein.

(3) Propylene Slurry Polymerization

The same process as in Example I-1 was repeated, except that the solid catalyst component prepared as above was used herein. The results are given in Table I-1 and Table I-2.

COMPARATIVE EXAMPLE I-2

(1) Preparation of Magnesium Compound

The same process as in Example I-3 was repeated, except that the reaction temperature herein was about 78° C. (at which the reactants were in reflux).

(2) Preparation of Solid Catalyst Component

The same process as in Example I-1 was repeated, except that the magnesium compound prepared as above was used herein.

(3) Propylene Slurry Polymerization

The same process as in Example I-1 was repeated, except that the solid catalyst component prepared as above was used herein. The results are given in Table I-1 and Table I-2. The particle size distribution index (P) of the carrier was over 4.0; and the bulk density of the polymer obtained was 310 (kg/m$^3$) and was low.

EXAMPLE I-4

(1) Preparation of Magnesium Compound

The same process as in Example I-1 was repeated, except that $MgCl_2$ (0.3 g, 6.3 milligram atoms per Cl) was used for the halide.

(2) Preparation of Solid Catalyst Component

The same process as in Example I-1 was repeated, except that the magnesium compound prepared as above was used herein.

(3) Propylene Slurry Polymerization

The same process as in Example I-1 was repeated, except that the solid catalyst component prepared as above was used herein. The results are given in Table I-1 and Table I-2.

COMPARATIVE EXAMPLE I-3

(1) Preparation of Magnesium Compound

The same process as in Example I-4 was repeated, except that the reaction temperature herein was about 78° C. (at which the reactants were in reflux).

(2) Preparation of Solid Catalyst Component

The same process as in Example I-1 was repeated, except that the magnesium compound prepared as above was used herein.

(3) Propylene Slurry Polymerization

The same process as in Example I-1 was repeated, except that the solid catalyst component prepared as above was used herein. The results are given in Table I-1 and Table I-2. The particle size distribution index (P) of the carrier was over 4.0; and the bulk density of the polymer obtained was 330 (kg/m$^3$) and was low.

EXAMPLE I-5

(1) Preparation of Magnesium Compound

The same process as in Example I-1 was repeated, except that the reaction temperature herein was 60° C.

(2) Preparation of Solid Catalyst Component

The same process as in Example I-1 was repeated, except that the magnesium compound prepared as above was used herein.

(3) Propylene Slurry Polymerization

The same process as in Example I-1 was repeated, except that the solid catalyst component prepared as above was used herein. The results are given in Table I-1 and Table I-2.

EXAMPLE I-6

(1) Preparation of Magnesium Compound

The same process as in Example I-1 was repeated.

(2) Preparation of Solid Catalyst Component

The same process as in Example I-1 was repeated.

(3) Propylene Slurry Polymerization

The same process as in Example I-1 was repeated, except that cyclohexylisobutyldimethoxysilane (CHIBDMS) and not dicyclopentyldimethoxysilane (DCPDMS) was used herein for the silane compound. The results are given in Table I-1 and Table I-2.

TABLE I-1

|  | Example I-1 | Example I-2 | Example I-3 | Example I-4 | Example I-5 | Example I-6 | Comp. Ex. I-1 | Comp. Ex. I-2 | Comp. Ex. I-3 |
|---|---|---|---|---|---|---|---|---|---|
| Reaction Temperature (° C.) | 40 | 50 | 50 | 50 | 60 | 40 | 78 | 78 | 78 |
| Halogen or Halogen Compound | iodine | iodine | iodine | $MgCl_2$ | iodine | iodine | iodine | iodine | $MgCl_2$ |
| Halogen or Halogen Compound/Mg (ratio by gram atom) | 0.019 | 0.019 | 0.0057 | 0.0057 | 0.019 | 0.019 | 0.019 | 0.0057 | 0.0057 |
| Number of Revolution (sec$^{-1}$) | 5.83 | 5.83 | 8.75 | 8.75 | 5.83 | 5.83 | 5.83 | 8.75 | 8.75 |
| Mean Particle Size of Carrier (μm) | 45 | 52 | 38 | 38 | 60 | 45 | 70 | 43 | 46 |
| Sphericity of Carrier (S) | 1.30 | 1.31 | 1.31 | 1.33 | 1.33 | 1.31 | 1.33 | 1.57 | 1.62 |
| Particle Size Distribution Index of Carrier (P) | 3.6 | 3.5 | 3.4 | 3.6 | 3.6 | 3.7 | 4.3 | 4.8 | 4.9 |

TABLE I-2

|  | Example I-1 | Example I-2 | Example I-3 | Example I-4 | Example I-5 | Example I-6 | Comp. Ex. I-1 | Comp. Ex. I-2 | Comp. Ex. I-3 |
|---|---|---|---|---|---|---|---|---|---|
| Silane Compound | DCPDMS | DCPDMS | DCPDMS | DCPDMS | DCPDMS | CHIBDMS | DCPDMS | DCPDMS | DCPDMS |
| Stereo-specificity (mol %) | 98.2 | 98.2 | 98.4 | 98.4 | 98.4 | 97.8 | 98.2 | 98.0 | 98.2 |
| Activity (kg/g-cat.) | 16 | 18 | 20 | 19 | 17 | 12 | 14 | 13 | 14 |
| Mean Particle Size of Polymer | 1100 | 1200 | 1000 | 1000 | 1500 | 900 | 1800 | 1500 | 1600 |

TABLE I-2-continued

| | Example I-1 | Example I-2 | Example I-3 | Example I-4 | Example I-5 | Example I-6 | Comp. Ex. I-1 | Comp. Ex. I-2 | Comp. Ex. I-3 |
|---|---|---|---|---|---|---|---|---|---|
| ($\mu$m) | | | | | | | | | |
| Sphericity of Polymer (S') | 1.31 | 1.33 | 1.33 | 1.31 | 1.30 | 1.33 | 1.31 | 1.52 | 1.57 |
| Particle Size Distribution Index of Polymer (P') | 3.6 | 3.5 | 3.5 | 3.6 | 3.6 | 3.6 | 4.2 | 4.6 | 4.8 |
| Bulk Density of Polymer (kg/cm$^3$) | 410 | 400 | 420 | 410 | 380 | 410 | 310 | 310 | 330 |

[II] Second Aspect of the Invention

The SECOND aspect of the invention (in this section, this will be simply referred to as "the invention") is described in detail hereinunder.

[I] Magnesium Compound

The magnesium compound of the invention (this will be referred to as a carrier) is obtained by reacting a metal magnesium, an alcohol, and at least 0.0005 gram atoms, in terms of the halogen atom relative to one gram mol of magnesium, of a halogen and/or a halogen-containing compound, in the presence of a saturated hydrocarbon compound.

For the details of the metal magnesium, the type, the amount, the purity and the water content of the alcohol, and the type of the halogen and the halogen-containing compound in this case, referred to are those mentioned in the section of the magnesium compound in the first aspect of the invention.

The amount of the halogen and/or the halogen-containing compound to be used herein is at least 0.0005 gram atoms, preferably at least 0.001 gram atoms, more preferably at least 0.002 gram atoms in terms of the halogen atom relative to one gram atom of the metal magnesium. In case where the amount of the halogen and/or the halogen-containing compound used is smaller than 0.0005 gram atoms, it does not differ from the case where a halogen is used as a reaction initiator; and if the resulting magnesium compound is used as a carrier for the catalyst in olefin polymerization, the catalyst activity is poor and the polymers produced could not have good morphology.

The uppermost limit of the amount of the halogen to be used is not specifically defined, and may be suitably determined within a range within which the intended magnesium compound of the invention can be obtained. In general, the amount of the halogen shall be smaller than 0.06 gram atoms. In the invention, one type or two or more different types of halogen and halogen-containing compounds may be used either singly or as combined. If desired, a halogen and a halogen-containing compound may be combined for use herein. Regarding the amount of the two, if combined for use herein, the total halogen content of the combination shall be at least 0.0005 gram atoms, preferably at least 0.001 gram atoms, more preferably at least 0.002 gram atoms, relative to one gram atom of the metal magnesium. In this case, the uppermost limit of the total halogen content is not specifically defined, and may be suitably determined within a range within which the intended magnesium compound of the invention can be obtained. In general, it is preferably smaller than 0.06 gram atoms. The particle size of the magnesium compound to be produced herein can be well controlled by changing and controlling the amount of the halogen and/or the halogen-containing compound to be used.

The reaction itself of the metal magnesium, the alcohol, and the halogen and/or the halogen-containing compound to give the magnesium compound may be effected in any known manner, except that they are reacted in the presence of a saturated hydrocarbon compound. They may be reacted generally at 30° C. or higher, but preferably at 40° C. or higher, more preferably at a temperature at which they are in reflux.

For the details of the mode of putting the reactants, metal magnesium, alcohol and halogen into a reactor in this section, referred to are those mentioned in the section of the first aspect of the invention.

In the invention, the reactants must be reacted in the presence of a saturated hydrocarbon compound, but the saturated hydrocarbon compound for the reaction is not specifically defined. It may be a saturated hydrocarbon compound having from 5 to 15 carbon atoms. The saturated hydrocarbon compound having from 5 to 15 carbon atoms may be any of linear saturated hydrocarbon compounds, branched saturated hydrocarbon compounds or alicyclic saturated hydrocarbon compounds. Of those, especially preferred are hexane, heptane, octane and decane. Regarding the timing in which such a saturated hydrocarbon compound is added to the reaction system, the compound may be present in the system during the reaction of the reactants, metal magnesium, alcohol, and halogen and/or halogen-containing compound, or may be present therein after the reaction, or may be present therein during and after the reaction. Preferably, the compound is present in the system during and after the reaction. The amount of the saturated hydrocarbon compound to be used is not specifically defined, so far as it does not detract from the object of the invention. Preferably, however, it falls generally between 0.02 and 5.0 times (by volume), more preferably between 0.05 and 2.5 times (by volume), even more preferably between 0.1 and 1.5 times (by volume) the amount of the alcohol. If it is smaller than 0.02 times, the bulk density of the polymer obtained will be low. If, however, it is larger than 5.0 times, large-size reactors will be necessary, and, in addition, the bulk density of the polymer obtained could not be increased. In the presence of such a saturated hydrocarbon compound, it is easy to obtain a magnesium compound capable of giving an olefin polymer having a higher bulk density and a more narrowed particle size distribution than conventionally.

In case where the magnesium compound obtained in the manner as above is used in producing the solid catalyst component (A) (this will be mentioned hereinunder), it may be dried or may be washed with an inert solvent such as heptane, after having been filtered out of the reaction mixture and before being used in producing the solid catalyst component (A). Anyhow, the magnesium compound obtained can be directly used in the next step, without being further ground or classified to dress its particles. The particles of the magnesium compound of the invention thus obtained are more spherical and have a more narrowed and sharper particle size distribution than those of any other conventional magnesium compounds. In addition, the distribution of sphericity of the individual particles is narrow.

The invention also provides a solid magnesium compound substantially comprising a magnesium alkoxide, of which the particle size distribution index (P) represented by the following formula (II-1) is smaller than 4.0, P<4.0.

$$P=(D_{90}/D_{10}) \qquad \text{(II-1)}$$

(wherein $D_{90}$, $D_{10}$ and P have the same meanings as those in the section of the first aspect of the invention.)

The solid magnesium compound of the invention preferably has P of smaller than 3.8, P<3.8.

Also preferably, the solid magnesium compound has a degree of sphericity (S) of the following formula (II-2) of smaller than 2.0, S<2.0.

$$S=(L_1/L_2)^3 \qquad \text{(II-2)}$$

(wherein $L_1$, $L_2$ and S have the same meanings as those in the section of the first aspect of the invention.)

More preferably, the solid magnesium compound of the invention has S of smaller than 1.5, S<1.5.

The solid magnesium compound generally has a mean particle size of from 10 to 100 µm. When compared with conventional magnesium compounds of which the mean particle conventional magnesium compounds of which the mean particle size is nearly the same as that of the solid magnesium compound of the invention, the solid magnesium compound of the invention has a smaller degree of sphericity, S, than that of the conventional magnesium compounds, and therefore its particles are nearer to complete spheres than the conventional magnesium compound particles. The solid magnesium compound of this type of the invention may be produced according to the method mentioned hereinabove.

[II] Olefin Polymerization Catalyst

The olefin polymerization catalyst of the invention comprises (A) a solid catalyst component prepared by contacting (a) the magnesium compound mentioned above, (b) a titanium compound of the following general formula (II-3) and optionally (c) an electron donor compound with each other, (B) an organometallic compound, and optionally (C) a third component of an electron donor compound.

$$Ti(OR)_nX_{4-n} \qquad \text{(II-3)}$$

(wherein X indicates a halogen atom; R indicates a hydrocarbon group having from 1 to 10 carbon atoms, and R's may be the same or different; and n indicates an integer of from 0 to 4.)

The constituent components are described below.

Component (A)

The component (A) is a solid catalyst component prepared by contacting (a) the magnesium compound mentioned above, (b) electron donor compound with each other.

Component (a)

The component (a) is the magnesium compound mentioned above.

Component (b)

The component (b) is a titanium compound of formula (II-3). In formula (II-3), X indicates a halogen atom, and is preferably a chlorine atom or a bromine atom, more preferably a chlorine atom. R indicates a hydrocarbon group, and it may be saturated or unsaturated, and may be linear, branched or cyclic. It may contain hetero atoms of sulfur, nitrogen, oxygen, silicon, phosphorus and others. Preferably, R is a hydrocarbon group having from 1 to 10 carbon atoms, more preferably an alkyl group, an alkenyl group, a cycloalkenyl group, an aryl group or an aralkyl group, even more preferably a linear or branched alkyl group. A plurality —OR groups, if any, in the formula may be the same or different. Specific examples of R include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group, a phenethyl group, etc. n indicates an integer of from 0 to 4.

Specific examples of the titanium compound of formula (II-3) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitanium trihalides such as methoxytitanium trichloride, ethoxytitanium trichloride, n-propoxytitanium trichloride, n-butoxytitanium trichloride, ethoxytitanium tribromide, etc.; dialkoxytitanium dihalides such as dimethoxytitanium dichloride, diethoxytitanium dichloride, diisopropoxytitanium dichloride, di-n-propoxytitanium dichloride, diethoxytitanium dibromide, etc.; trialkoxytitanium monohalides such as trimethoxytitanium chloride, triethoxytitanium chloride, triisopropoxytitanium chloride, tri-n-propoxytitanium chloride, tri-n-butoxytitanium chloride, etc. Of those, preferred are high-halogen titanium compounds, and especially preferred is titanium tetrachloride. One or more of these titanium compounds may be used herein either singly or as combined.

Electron Donor Compound (c)

For the details of the electron donor compound for use herein, referred to are those mentioned in the section of "Electron Donor Compound (c)" in the first aspect of the invention. For the electron donor compound for use herein, preferred are diphthalates. Preferably, the organic group in the ester moiety of the esters is a linear or branched aliphatic hydrocarbon residue having at least 4 carbon atoms.

The solid catalyst component (A) is prepared by contacting the magnesium compound (a), the titanium compound (b) and optionally the electron donor compound (c) and further optionally a halide (d) such as silicon tetrachloride with each other, and they be contacted and reacted with each other in any ordinary manner. For the details of their amount, their condition and the order in which they are contacted with each other, referred to are those mentioned in the section of the first aspect of the invention. The solid catalyst component may be stored in dry, or may be stored in an inert solvent such as hydrocarbons, etc.

Component (B)

The component (B) includes organoaluminium compounds. The organoaluminium compounds for it are not specifically defined. For their details, referred to are those mentioned in the section of the first aspect of the invention.

Electron Donor Compound (C)

In the invention, optionally used is a third component of an electron donor compound (C). Using an electron donor compound is preferred, as improving the stereospecificity of the olefin polymers produced. For the details of the electron donor compound, referred to are those mentioned in the section of "Electron Donor Compound (C)" in the first aspect of the invention.

The amount of the catalyst components to be used herein is not specifically defined, and for its details, referred to are those mentioned in the section of the first aspect of the invention.

[III] Method for Producing Olefin Polymers

For producing olefin polymers according to the invention, an olefin is polymerized in the presence of the above-mentioned olefin polymerization catalyst. The olefin to be polymerized herein is not specifically defined, and for its details, referred to are those mentioned in the section of the first aspect of the invention. One or more olefins may be used herein either singly or as combined. Of the olefins mentioned above, especially preferred is propylene. For its polymerization mode, the olefin may be homopolymerized or copolymerized. Especially preferred is homopolymerization of propylene, or copolymerization of propylene with ethylene and/or an α-olefin having from 4 to 20 carbon atoms (1-butene, 1-hexene, etc.). If desired, dienes such as butadiene, and any other olefins may be additionally used in producing the olefin polymers.

In the olefin polymerization method of the invention, if desired, an olefin may be first prepolymerized and then finally polymerized. For the details of prepolymerization, referred to are those mentioned in the section of the first aspect of the invention.

Regarding the catalyst components for use in the invention, the component (A), the component (B) and the component (C) may be previously blended in a predetermined ratio so that they are contacted with each other, and immediately an olefin may be applied thereto to start its polymerization. Alternatively, after the catalyst components have been contacted with each other, the resulting catalyst may be ripened for 0.2 to 3 hours or so, and thereafter an olefin may be applied thereto and polymerized in the presence of the thus-ripened catalyst. If desired, the catalyst components may be previously suspended in an inert solvent or olefin, and then fed into the polymerization system.

In the invention, the post-treatment after polymerization may be effected in any ordinary manner. For its details, referred to are those mentioned in the section of the first aspect of the invention.

According to the method of the invention, the powdery olefin polymer produced has the advantages of high bulk density and narrow particle size distribution. Other advantages of the invention are that the polymer produced has good stereospecificity and that the catalyst used has high polymerization activity. For example, in homopolymerization of propylene in the method, produced is a propylene homopolymer having a bulk density (kg/m$^3$) of at least 345, preferably at least 380, and having good stereospecificity, and the catalyst used exhibits high polymerization activity. In addition, the propylene homopolymer thus produced has a particle size distribution index (P') of smaller than 4.0, P'<4.0, preferably smaller than 3.8, P'<3.8. That is, the particle size distribution of the propylene homopolymer is narrower than that of conventional propylene homopolymers. When compared with conventional propylene homopolymers of which the mean particle size is nearly the same as that of the propylene homopolymer produced according to the method of the invention, the propylene homopolymer produced in the invention has a smaller degree of sphericity (S') than that of the conventional propylene homopolymers. For its powdery morphology, the particles of the propylene homopolymer produced in the invention are nearer to complete spheres than those of conventional propylene homopolymers.

The invention is described in more detail with reference to the following Examples, which, however, are not intended to restrict the scope of the invention.

The methods for analyzing and evaluating the polymers of the invention are described below.

(1) Stereospecificity [mmmm]

For its details, referred to are those mentioned in the section of the first aspect of the invention.

(2) Particle Size Distribution Index (P) of Magnesium Compound

For its details, referred to are those mentioned in the section of the first aspect of the invention.

(3) Sphericity (S) of Magnesium Compound

For its details, referred to are those mentioned in the section of the first aspect of the invention.

(4) Particle Size Distribution Index (P') of Polyolefin Powder

For its details, referred to are those mentioned in the section of the first aspect of the invention.

(5) Sphericity (S') of Polyolefin Powder

For its details, referred to are those mentioned in the section of the first aspect of the invention.

(6) Bulk Density of Polyolefin Powder

Measured according to JIS K6721.

EXAMPLE II-1

(1) Preparation of Magnesium Compound 0.155 dm$^3$ (2.64 gram atoms) of dewatered ethanol, 0.31 dm$^3$ of n-heptane, 0.8 g (6.3 milligram atoms) of iodine, and 8 g (0.33 gram atoms) of metal magnesium were put into a 0.5 dm$^3$ three-neck flask equipped with a stirrer and purged with nitrogen, and these were reacted with stirring (5.83 sec$^{-1}$, 350 rpm) at 40° C. until hydrogen gas was no more generated. Next, 0.124 dm$^3$ of n-heptane was added thereto, and cooled to room temperature. The solid thus formed was taken out and dried to obtain a magnesium compound.

(2) Preparation of Solid Catalyst Component

A 0.5 dm$^3$ three-neck flask equipped with a stirrer was purged with nitrogen, and 16 g of the magnesium compound obtained in the step (1) was put thereinto, to which was added 0.080 dm$^3$ of dewatered octane. This was heated at 40° C., and 0.0024 dm$^3$ (23 mmols) of silicon tetrachloride was added thereto and stirred for 20 minutes, to which was added 0.0035 dm$^3$ (13 mmols) of di-n-butyl phthalate. The resulting solution was further heated up to 80° C., and 0.062 dm$^3$(0.56 mols) of titanium tetrachloride was dropwise added thereto through a dropping funnel. Next, the flask was still further heated to have an inner temperature of 125° C., at which the compounds therein were contacted with each other for 2 hours. After this, the reaction mixture was fully washed with dewatered octane. 0.107 dm$^3$ (0.98 mols) of titanium tetrachloride was added to this, and heated to have an inner temperature of 125° C., at which the compounds were again contacted with each other for 2 hours. Next, this was fully washed with dewatered octane. Thus was obtained a solid catalyst component.

(3) Propylene Slurry Polymerization

A one dm$^3$ stainless autoclave equipped with a stirrer was fully dried and purged with nitrogen, and 0.4 dm$^3$ of dewatered heptane was put into it. 2.0 mmols of triethylaluminium and then 0.25 mmols of dicyclopentyldimethoxysilane (DCPDMS) were added thereto in that order. Then, 0.0025 mmols, in terms of Ti, of the solid catalyst component prepared in (2) was added thereto, and hydrogen (0.1 MPa) and propylene were introduced thereinto in that order to have a total pressure of 0.8 MPa. With that, the monomer propylene was polymerized at 80° C. for 1 hour. Next, the system was cooled and degassed, and the reaction mixture was taken out of it. This was put into 2 dm³ of methanol, and then dried in vacuum to obtain polypropylene. The results are given in Table II-1.

COMPARATIVE EXAMPLE II-1
(1) Preparation of Magnesium Compound
  The same process as in Example II-1 was repeated, except that n-heptane was not added to the system herein.
(2) Preparation of Solid Catalyst Component
  The same process as in Example II-1 was repeated, except that the magnesium compound prepared as above was used herein.
(3) Propylene Slurry Polymerization
  The same process as in Example II-1 was repeated, except that the solid catalyst component prepared as above was used herein. The results are given in Table II-1. The particle size distribution index (P) of the carrier was over 4.0; and the bulk density of the polymer obtained was 310 (kg/m³) and was low.

COMPARATIVE EXAMPLE II-2
(1) Preparation of Magnesium Compound
  The same process as in Example II-1 was repeated, except that n-heptane was not added, that the amount of iodine added was 0.24 g (1.9 milligram atoms) and that the number of revolution was 8.75 sec$^{-1}$ (525 rpm).
(2) Preparation of Solid Catalyst Component
  The same process as in Example II-1 was repeated, except that the magnesium compound prepared as above was used herein.
(3) Propylene Slurry Polymerization
  The same process as in Example II-1 was repeated, except that the solid catalyst component prepared as above was used herein. The results are given in Table II-1. The particle size distribution index (P) of the carrier was over 4.0; and the bulk density of the polymer obtained was 310 (kg/m³) and was low.

EXAMPLE II-2
(1) Preparation of Magnesium Compound
  The same process as in Example II-1 was repeated, except that 0.031 dm³ of n-heptane was in the system during reaction and that 0.031 dm³ of n-heptane was therein during solid precipitation.
(2) Preparation of Solid Catalyst Component
  The same process as in Example II-1 was repeated, except that the magnesium compound prepared as above was used herein.
(3) Propylene Slurry Polymerization
  The same process as in Example II-1 was repeated, except that the solid catalyst component prepared as above was used herein. The results are given in Table II-1.

EXAMPLE II-3
(1) Preparation of Magnesium Compound
  The same process as in Example II-1 was repeated, except that 0.031 dm³ of n-heptane was in the system only during reaction.
(2) Preparation of Solid Catalyst Component
  The same process as in Example II-1 was repeated, except that the magnesium compound prepared as above was used herein.
(3) Propylene Slurry Polymerization
  The same process as in Example II-1 was repeated, except that the solid catalyst component prepared as above was used herein. The results are given in Table II-1.

EXAMPLE II-3
(1) Preparation of Magnesium Compound
  The same process as in Example II-3 was repeated, except that 8 mg (0.063 milligram atoms) of iodine was added to the system herein.
(2) Preparation of Solid Catalyst Component
  The same process as in Example II-1 was repeated, except that the magnesium compound prepared as above was used herein.
(3) Propylene Slurry Polymerization
  The same process as in Example II-1 was repeated, except that the solid catalyst component prepared as above was used herein. The results are given in Table II-1. The particle size distribution index (P) of the carrier was over 4.0; and the bulk density of the polymer obtained was 290 (kg/m³) and was low.

EXAMPLE II-4
(1) Preparation of Magnesium Compound
  The same process as in Example II-1 was repeated, except that 0.031 dm³ of n-heptane was in the system only during solid precipitation.
(2) Preparation of Solid Catalyst Component
  The same process as in Example II-1 was repeated, except that the magnesium compound prepared as above was used herein.
(3) Propylene Slurry Polymerization
  The same process as in Example II-1 was repeated, except that the solid catalyst component prepared as above was used herein. The results are given in Table II-2.

EXAMPLE II-5
(1) Preparation of Magnesium Compound
  The same process as in Example II-1 was repeated, except that 0.155 dm³ of n-heptane was in the system only during solid precipitation.
(2) Preparation of Solid Catalyst Component
  The same process as in Example II-1 was repeated, except that the magnesium compound prepared as above was used herein.
(3) Propylene Slurry Polymerization
  The same process as in Example II-1 was repeated, except that the solid catalyst component prepared as above was used herein. The results are given in Table II-2.

EXAMPLE II-6
(1) Preparation of Magnesium Compound
  The same process as in Example II-1 was repeated, except that 0.155 dm³ of n-decane was in the system only during solid precipitation.
(2) Preparation of Solid Catalyst Component
  The same process as in Example II-1 was repeated, except that the magnesium compound prepared as above was used herein.
(3) Propylene Slurry Polymerization
  The same process as in Example II-1 was repeated, except that the solid catalyst component prepared as above was used herein. The results are given in Table II-2.

EXAMPLE II-7
(1) Preparation of Magnesium Compound
  The same process as in Example II-1 was repeated, except that MgCl$_2$ (0.3 g, 6.3 milligram atoms per Cl) was used for the halide herein.
(2) Preparation of Solid Catalyst Component
  The same process as in Example II-1 was repeated, except that the magnesium compound prepared as above was used herein.

(3) Propylene Slurry Polymerization

The same process as in Example II-1 was repeated, except that the solid catalyst component prepared as above was used herein. The results are given in Table II-2.

COMPARATIVE EXAMPLE II-4

(1) Preparation of Magnesium Compound

The same process as in Example II-7 was repeated, except that n-heptane was not used herein.

(2) Preparation of Solid Catalyst Component

The same process as in Example II-1 was repeated, except that the magnesium compound prepared as above was used herein.

(3) Propylene Slurry Polymerization

The same process as in Example II-1 was repeated, except that the solid catalyst component prepared as above was used herein. The results are given in Table II-2. The particle size distribution index (P) of the carrier was over 4.0; and the bulk density of the polymer obtained was 340 (kg/m$^3$) and was low.

EXAMPLE II-8

(1) Preparation of Magnesium Compound

The same process as in Example II-1 was repeated.

(2) Preparation of Solid Catalyst Component

The same process as in Example II-1 was repeated.

(3) Propylene Slurry Polymerization

The same process as in Example II-1 was repeated, except that cyclohexylisobutyldimethoxysilane (CHIBDMS) and not dicyclopentyldimethoxysilane (DCPDMS) was used herein for the silane compound. The results are given in Table II-2.

Industrial Applicability

According to the invention, obtained are powdery olefin polymers having good stereospecificity, high bulk density and narrow particle size distribution, and the catalyst used exhibits high polymerization activity.

TABLE II-1

|  | Example II-1 | Comp. Ex. II-1 | Example II-2 | Comp. Ex. II-2 | Example II-3 | Comp. Ex. II-3 |
|---|---|---|---|---|---|---|
| Saturated Hydrocarbon | heptane | none | none | heptane | heptane | heptane |
| Amount of Hydrocarbon during reaction (dm$^3$) | 0.031 | 0 | 0 | 0.031 | 0.031 | 0.031 |
| Amount of Hydrocarbon after reaction (dm$^3$) | 0.124 | 0 | 0 | 0.031 | 0 | 0 |
| Amount of EtOH during reaction (dm$^3$) | 0.155 | 0.155 | 0.155 | 0.155 | 0.155 | 0.155 |
| Halogen or Halogen Compound | iodine | iodine | iodine | iodine | iodine | iodine |
| Halogen or Halogen Compound/Mg (by gram atom) | 0.019 | 0.019 | 0.0057 | 0.019 | 0.019 | 0.00019 |
| Number of Revolution (sec$^{-1}$) | 5.83 | 5.83 | 8.75 | 5.83 | 5.83 | 5.83 |
| Mean Particle Size of Carrier ($\mu$m) | 41 | 70 | 43 | 42 | 44 | 500 |
| Sphericity of Carrier (S) | 1.20 | 1.21 | 1.35 | 1.19 | 1.21 | 1.80 |
| Particle Size Distribution Index of Carrier (P) | 3.8 | 4.3 | 4.8 | 3.7 | 3.8 | 7.2 |
| Silane Compound | DCPDMS | DCPDMS | DCPDMS | DCPDMS | DCPDMS | DCPDMS |
| Stereospecificity (mol %) | 98.4 | 98.2 | 98.0 | 98.4 | 98.2 | 98.0 |
| Activity (kg/g-cat.) | 11 | 14 | 13 | 12 | 13 | 14 |
| Mean Particle Size of Polymer ($\mu$m) | 900 | 1800 | 1500 | 1000 | 1100 | 1200 |
| Sphericity of Polymer (S') | 1.21 | 1.20 | 1.32 | 1.20 | 1.22 | 1.75 |
| Particle Size Distribution Index of Polymer (P') | 3.7 | 4.2 | 4.6 | 3.6 | 3.7 | 7.0 |
| Bulk Density of Polymer (kg/m$^3$) | 450 | 310 | 310 | 440 | 430 | 290 |

TABLE II-2

|  | Example II-4 | Example II-5 | Example II-6 | Example II-7 | Comp. Ex. II-4 | Example II-8 |
|---|---|---|---|---|---|---|
| Saturated Hydrocarbon | heptane | heptane | decane | heptane | none | heptane |
| Amount of Hydrocarbon during reaction (dm$^3$) | 0 | 0 | 0 | 0.031 | 0 | 0.031 |
| Amount of Hydrocarbon after reaction (dm$^3$) | 0.031 | 0.155 | 0.155 | 0.124 | 0 | 0.124 |
| Amount of EtOH during reaction (dm$^3$) | 0.155 | 0.155 | 0.155 | 0.155 | 0.155 | 0.155 |
| Halogen or Halogen Compound | iodine | iodine | iodine | MgCl$_2$ | MgCl$_2$ | iodine |
| Halogen or Halogen Compound/Mg (by gram atom) | 0.019 | 0.019 | 0.019 | 0.019 | 0.019 | 0.019 |
| Number of Revolution (sec$^{-1}$) | 5.83 | 5.83 | 5.83 | 5.83 | 5.83 | 5.83 |
| Mean Particle Size of Carrier ($\mu$m) | 45 | 42 | 43 | 42 | 75 | 41 |
| Sphericity of Carrier (S) | 1.20 | 1.21 | 1.20 | 1.21 | 1.23 | 1.20 |
| Particle Size Distribution Index of Carrier (P) | 3.6 | 3.7 | 3.7 | 3.8 | 4.8 | 3.8 |
| Silane Compound | DCPDMS | DCPDMS | DCPDMS | DCPDMS | DCPDMS | CHIBDMS |
| Stereospecificity (mol %) | 98.4 | 98.2 | 98.2 | 98.2 | 98.2 | 97.8 |
| Activity (kg/g-cat.) | 13 | 12 | 11 | 12 | 13 | 9 |
| Mean Particle Size of Polymer ($\mu$m) | 1100 | 1000 | 900 | 1000 | 1700 | 900 |
| Sphericity of Polymer (S') | 1.20 | 1.22 | 1.22 | 1.21 | 1.23 | 1.22 |
| Particle Size Distribution Index of Polymer (P') | 3.7 | 3.6 | 3.8 | 3.8 | 4.7 | 3.7 |
| Bulk Density of Polymer (kg/m$^3$) | 420 | 430 | 430 | 440 | 340 | 430 |

What is claimed is:

1. A magnesium compound consisting essentially of a magnesium dialkoxide, prepared by reacting metallic magnesium, an alcohol and 0.0001 to less than 0.06 gram atom, in terms of halogen atoms relative to one gram atom of magnesium, of a halogen and/or a halogen-containing metal compound, at 30° to 60° C.

2. The magnesium compound as claimed in claim 1, wherein the halogen is iodine.

3. The magnesium compound as claimed in claim 1, wherein the halogen-containing compound is magnesium chloride.

4. The magnesium compound as claimed in claim 1, wherein the alcohol is ethanol.

5. The magnesium compound as claimed in claim 1, wherein the amount of alcohol ranges from 5 to 50 mols relative to one mole of magnesium.

6. The magnesium compound as claimed in claim 1, wherein the ratio of halogen or a halogen compound to magnesium, on a gram atom basis, is 0.019 or less.

7. A solid magnesium compound as claimed in claim 1, wherein the particle size distribution index (P) as defined in formula (I-1), is smaller than 4.0, P<4.0:

$$P=(D_{90}/D_{19}) \quad (I1)$$

wherein $D_{90}$ indicates the particle diameter of the compound particles corresponding to the cumulative weight fraction of 90% in the particle size distribution thereof computed from light transmittance through a suspension of the compound particles in a hydrocarbon; and $D_{10}$ indicates the particle diameter of the compound particles corresponding to the cumulative weight fraction of 10% therein.

8. The magnesium compound as claimed in claim 7, wherein the mean particle size ranges from 38 to 60 μm.

9. A magnesium compound consisting essentially of a magnesium dialkoxide prepared by reacting metallic magnesium, an alcohol and at least 0.0005 to less than 0.06 gram atoms, in terms of halogen atoms relative to one gram atom of magnesium, of a halogen and/or a halogen-containing metal compound, in the presence of a saturated hydrocarbon compound.

10. The magnesium compound as claimed in claim 9, wherein the halogen is iodine.

11. The magnesium compound as claimed in claim 9, wherein the halogen-containing compound is magnesium chloride.

12. The magnesium compound as claimed in claim 9, wherein the alcohol is ethanol.

13. The magnesium compound as claimed in claim 9, wherein the ratio of halogen or a halogen compound to magnesium, on a gram atom basis, is 0.019 or less.

14. A solid magnesium compound as claimed in claim 9, wherein the particle size distribution index (P), as defined in formula (I-1), is smaller than 4.0, P<4.0:

$$P=(D_9/D_{19}) \quad (I-1)$$

wherein $D_{90}$ indicates the particle diameter of the compound particles corresponding to the cumulative weight fraction of 90% in the particle size distribution thereof computed from light transmittance through a suspension of the compound particles in a hydrocarbon; and $D_{30}$ indicates the particle diameter of the compound particles corresponding to the cumulative weight fraction of 10% therein, and whose particles have a sphericity (S), as defined in formula (I-2), of smaller than 2.0, S<2.0:

$$S=(L_1/L_2)^3$$

wherein $L_1$ indicates the major diameter of the magnesium compound particle prepared by imaging the compound through scanning electronic microscopy followed by analyzing the projected image of the particle, and $L_2$ indicates the diameter of the circle having the same area as the projected area of the magnesium compound particle.

15. The magnesium compound as claimed in claim 14, wherein the mean particle size ranges from 38 to 60 μm.

16. A magnesium compound consisting essentially of magnesium dialkoxide prepared by reacting a combination of reactants consisting essentially of metallic magnesium, a hydrocarbyl alcohol and 0 0001 to less than 0.06 gram atoms, in terms of halogen atoms relative to one gram atom of magnesium, of a halogen and/or a halogen-containing metal compound, at 30° to 60° C.

17. A magnesium compound consisting essentially of magnesium dialkoxide prepared by reacting a combination of reactants consisting essentially of metallic magnesium, a $C_{1-6}$-aliphatic alcohol and 0.0001 to less than 0.06 gram atoms, in terms of halogen atoms relative to one gram atom of magnesium, of a halogen and/or a halogen-containing metal compound, at 30° to 60° C.

18. A magnesium compound consisting essentially of magnesium dialkoxide prepared by reacting metallic magnesium, a $C_{1-6}$-aliphatic alcohol and at least 0.0005 to less than 0.06 gram atoms, in terms of halogen atoms relative to one gram atom of magnesium, of a halogen and/or a halogen-containing metal compound, in the presence of a saturated hydrocarbon compound.

19. A magnesium alkoxide compound consisting essentially of a magnesium dialkoxide prepared by reacting metallic magnesium, an alcohol and 0.0001 to less than 0.06 gram atom, in terms of halogen atoms relative to one gram atom of magnesium, of a halogen and/or a halogen-containing metal compound, at 30° to 60° C., the particulate magnesium dialkoxide compound obtained having a mean particle size ranging from 38 to 60 μm, a degree of sphericity S of less than 2 and a particle size distribution index (P) of less than 4.0.

* * * * *